(12) United States Patent
Awad

(10) Patent No.: US 10,768,363 B1
(45) Date of Patent: Sep. 8, 2020

(54) PLASMONIC INFRARED OPTICAL ANTENNA

(71) Applicant: KING SAUD UNIVERSITY, Riyadh (SA)

(72) Inventor: Ehab Awad, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 16/662,003

(22) Filed: Oct. 23, 2019

(51) Int. Cl.
- G02B 6/12 (2006.01)
- B82Y 20/00 (2011.01)
- H01Q 1/52 (2006.01)
- G02B 5/00 (2006.01)

(52) U.S. Cl.
CPC .......... *G02B 6/12007* (2013.01); *B82Y 20/00* (2013.01); *G02B 5/008* (2013.01); *H01Q 1/523* (2013.01)

(58) Field of Classification Search
CPC .... G02B 6/12007; G02B 5/008; B82Y 20/00; H01Q 1/523
See application file for complete search history.

(56) References Cited

U.S. PATENT DOCUMENTS

| | | | |
|---|---|---|---|
| 6,768,556 B1 * | 7/2004 | Matsumoto | G01Q 60/22 250/311 |
| 8,462,334 B2 | 6/2013 | Lu et al. | |
| 8,711,463 B2 | 4/2014 | Han et al. | |
| 2012/0107958 A1 | 5/2012 | Poponin | |
| 2012/0170097 A1 * | 7/2012 | Han | B82Y 20/00 359/238 |
| 2012/0281957 A1 | 11/2012 | Chamanzar et al. | |
| 2019/0178805 A1 | 6/2019 | Su et al. | |

FOREIGN PATENT DOCUMENTS

| | | | | |
|---|---|---|---|---|
| DE | 10 2006 040 057 | * | 2/2008 | ............. G12B 21/06 |
| WO | 2018104898 A1 | | 6/2018 | |

OTHER PUBLICATIONS

Atmatzakis et al., "Magneto-optical response in bimetallic Metamaterials," Nanophotonics, Jul. 22, 2017; 7(1): 199-206.
Awad, "Nano-plasmonic Bundt Optenna for broadband polarization-insensitive and enhanced infrared detection," Scientific Reports, vol. 9, Aug. 21, 2019.

* cited by examiner

*Primary Examiner* — Chris H Chu
(74) *Attorney, Agent, or Firm* — Richard C. Litman; Nath, Goldberg & Meyer

(57) ABSTRACT

The plasmonic infrared optical antenna includes an upper layer of a metallic material (such as gold) capable of supporting a plasmonic electromagnetic field, a thin middle layer of an infrared absorption material, and a bottom supporting layer of a thick substrate. The upper layer has a 2-dimensional periodic array of micron-sized plasmonic antenna cells defined therein. Each antenna cell has the shape of a Bundt baking pan, including a conical antenna horn having an inverted frusto-conical upper portion and a cylindrical stem or lower portion depending from the upper portion. The upper layer includes a post concentrically disposed in the cylindrical lower portion, the post having a conical upper portion extending into the horn, a cylindrical middle portion defining an annular waveguide of 50 nm clearance between the post and the stem of the conical horn, and a conical wedge base embedded in the thin layer of infrared absorption material.

9 Claims, 9 Drawing Sheets

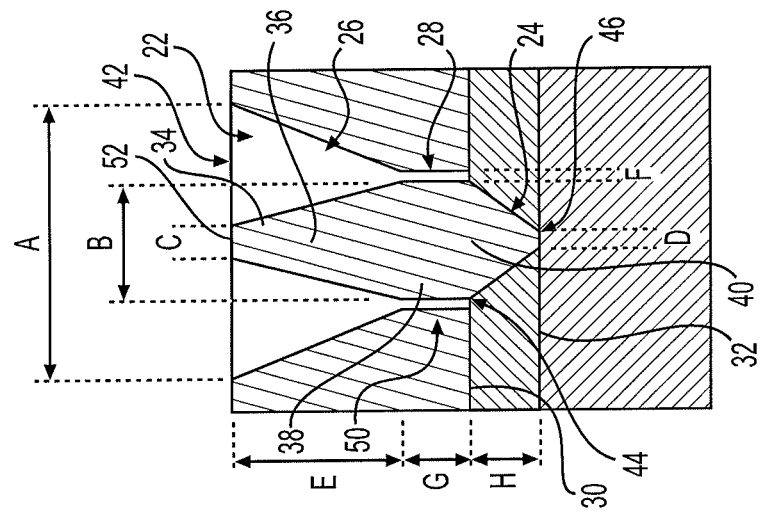
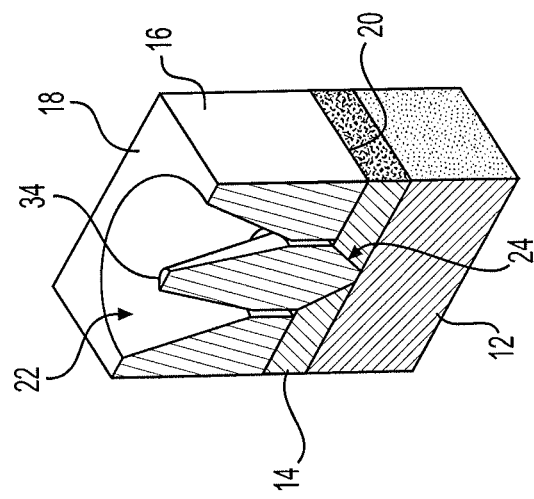
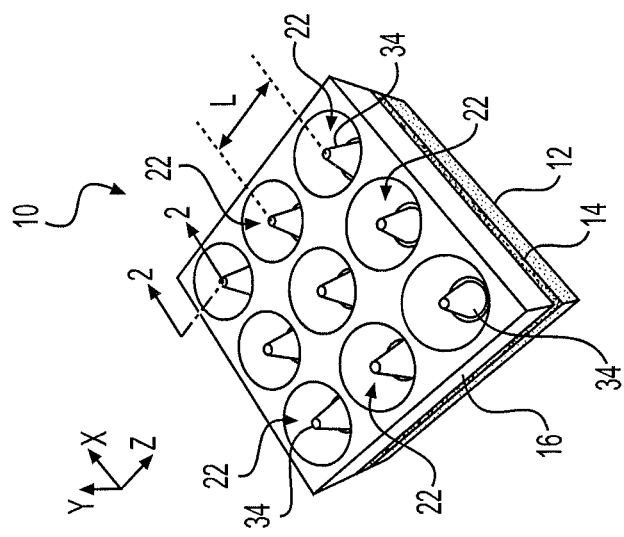

PLASMONIC INFRARED OPTICAL ANTENNA

BACKGROUND

1. Field

The disclosure of the present patent application relates to antennas, and particularly to a plasmonic infrared optical antenna for infrared reception and detection.

2. Description of the Related Art

Infrared (IR) optical detection devices, such as photodetectors, solar cells, cameras, and microbolometers have become smaller in size in recent years, with a relatively small effective active area, typically in the range of a few micrometers or, in some cases, in the nanometer range. Such small sizes provide numerous advantages, such as an ultrafast optical response, low operating temperatures, efficient cooling, efficient generation/collection of photocarriers, small pixel-sizes for high spatial resolution imaging, and the possibility of ultra-dense integration with other devices. However, these advantages come at the expense of the smaller aperture area of the device and, in turn, an inefficient collection of infrared energy. Thus, there is great interest in infrared plasmonic optical antennas, since such antennas should have the ability to efficiently collect optical energy from a large free-space area and concentrate that energy down to the small area of a desired device. The concentration of the plasmonic field down to the sub-wavelength nano-scale increases the effective absorption cross section area of absorbing thin film atoms and, in turn, the material absorption coefficient.

Although optical plasmonic antennas are already being experimented with, there are numerous considerations that must be taken into account in order to produce an optical plasmonic antenna array that can be practically and effectively used. A primary consideration is that the optical antenna shape should be designed to collect optical energy from a large aperture free-space area and focus it down to a sub-wavelength nano-scale area. This requires careful design of the optical antenna shape in order to match optical impedance between the free space and detection device. In other words, it is necessary to minimize back-reflections of optical energy from the antenna. Such reflections can degrade the infrared energy collection efficiency.

Additionally, since the infrared energy excites surface plasmon polaritons (SPPs) (traveling waves on optical antenna metal surfaces), it is desirable to have a relatively small antenna size to avoid SPP ohmic power losses on the metal surfaces. Further, it would be desirable to have a polarization-insensitive operation for the optical antenna, thus allowing the antenna to collect energy from any type of incident polarized or unpolarized infrared radiation. Moreover, such an antenna should have a broad bandwidth to collect as much energy as is contained within one particular wavelength band. Thus, a plasmonic infrared optical antenna solving the aforementioned problems is desired.

SUMMARY

The plasmonic infrared optical antenna is an optical antenna array operating in the infrared light range. The antenna includes an upper layer of a metallic material (such as gold) capable of supporting a plasmonic electromagnetic field, a thin middle layer of an infrared absorption material, and a bottom supporting layer of a thick substrate. The upper layer has a 2-dimensional periodic array of micron-sized plasmonic antenna cells defined therein. Each antenna cell has the shape of a Bundt baking pan, including a conical antenna horn having an inverted frusto-conical upper portion and a cylindrical stem or lower portion depending from the upper portion, much like a funnel. The upper layer includes a post concentrically disposed in the cylindrical lower portion, the post having a conical upper portion extending into the horn, a cylindrical middle portion defining an annular waveguide of 50 nm clearance between the post and the stem of the conical horn, and a conical wedge base embedded in the thin layer of infrared absorption material.

The horn and post are dimensioned so that incident free-space infrared radiation is almost totally collected by the array of Bundt cells through the large apertures defined by the horn and post structure. The horn and post of the cells, with air providing a dielectric, act like a metal-insulator-metal (MIM) structure with a conical flare. The horn and post structure is end-fire excited by incident IR radiation to generate surface plasmon polaritons (SPPs) on its gold surfaces and results in a $TE_{11}$ mode (i.e., there is no electric field in the direction of propagation of the SPP wave, only magnetic) propagating along the MIM conical structure in the negative y-direction. Both the plasmonic electric and magnetic fields are squeezed gradually until they reach a sub-wavelength nano-wide annular area at the annular waveguide. The dimensions of the waveguide are selected to minimize optical back-reflections and maximize forward propagation. The conical wedge and the base of the Bundt (antenna horn) structure act together as a flared MIM structure excited by the SPP exiting the waveguide, propagating the excited SPP to spread and penetrate deep inside the thin infrared absorbing layer, thus increasing the overall absorption area inside the thin-film. The plasmonic infrared optical antenna may be optimized for use in solar cells, optical communications photodetectors, SWIR sensors/cameras, and MWIR thermal detection/imaging with microbolometers, and other applications.

These and other features of the present disclosure will become readily apparent upon further review of the following specification and drawings.

BRIEF DESCRIPTION OF THE DRAWINGS

FIG. 1 is a perspective view of a plasmonic infrared optical antenna.

FIG. 2A is a perspective view in section of a single antenna cell of the plasmonic infrared optical antenna of FIG. 1.

FIG. 2B is an elevational view in section of the single antenna cell of FIG. 2A.

Similar reference characters denote corresponding features consistently throughout the attached drawings.

DETAILED DESCRIPTION OF THE PREFERRED EMBODIMENTS

Figure 3C:
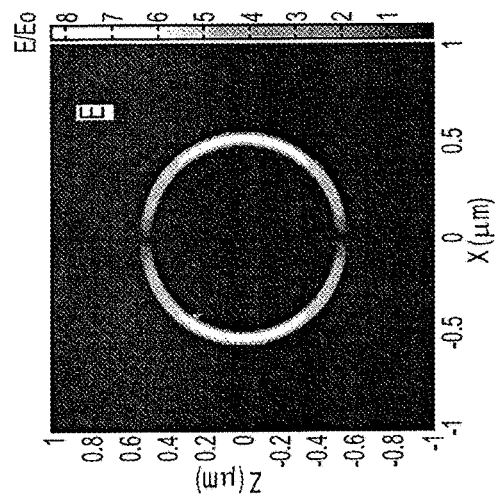
FIG. 3C shows the normalized electric field magnitude results of the 3D FDTD simulation performed on a single antenna cell of the plasmonic infrared optical antenna, shown here for a horizontal cross-section located at an input of the annular waveguide (WG).

The plasmonic infrared optical antenna is an optical antenna array operating in the infrared light range. As shown in FIG. 1, the antenna 10 includes an upper layer 16 of a metallic material (such as gold) capable of supporting a plasmonic electromagnetic field, a thin middle layer 14 of an infrared absorption material, and a bottom supporting layer 12 of a thick substrate. The upper layer 16 has a 2-dimensional periodic array of micron-sized plasmonic antenna cells 22 defined therein. Referring to FIG. 2B, each antenna cell 22 has the shape of a Bundt baking pan, including a conical antenna horn having an inverted frusto-conical upper portion 26 and a cylindrical stem or lower portion 28 depending from the upper portion 26, much like a funnel. The upper layer 16 includes a post 34 concentrically disposed in the cylindrical lower portion 28, the post 34 having a conical upper portion 36 extending into the horn, a cylindrical middle portion 38 defining an annular waveguide 50 of fifty nm clearance between the post 34 and the stem 28 of the conical horn, and a conical wedge base 40 embedded in the thin layer 14 of infrared absorption material. It should be understood that the 3×3 array of antenna cells 22 is shown in FIG. 1 for purposes of illustration only, and that any suitable number of antenna cells 22 may be arrayed to form the a plasmonic infrared optical antenna 10.

Each conical wedge 40 forms a frusto-conical recess 24 in the thin-film layer 14 having a decreasing diameter from an upper surface 30 of the thin film layer 14 toward a lower surface 32 of thin film layer 14. The upper and lower portions 26, 28 of each cell 22 are concentric with and in open communication with one another, and the frusto-conical recess 24 is concentric with and in open communication with the conical horn of the corresponding first cell 22 of the array.

The upper layer 16 includes a corresponding array of antenna posts 34 formed from the same material that forms the conical antenna horn. Each antenna post 34 has an upper portion 36, a middle portion 38 and a conical wedge base 40, and the upper and middle portions 36, 38 of each antenna post 34 is positioned concentrically within the conical antenna horn of its corresponding cell 22. The upper portion 36 of each antenna post 34 is frusto-conical, with an increasing diameter from an upper edge 42 of the upper portion 26 of the cell 22 to the lower portion 28. The middle portion 38 of each antenna post 34 is cylindrical, and the conical wedge 40 of each antenna post 34 has a decreasing diameter from an upper surface 44 of the thin-film layer 14 to the lower surface 46 of the layer 14.

The upper portion 36 of each antenna post 34 extends from a level even with the upper surface 18 of the upper layer 16 to the opening of the annular waveguide 50. The central portion 38 of each antenna post 34 is concentric with the lower portion 28 of the conical antenna horn and has a diameter less than a diameter of the lower portion 28 to define the annular waveguide 50 between the post 34 and the lower portion 28 in the form of an annular air gap between the exterior surface of the central portion 38 of the post 34 and the cylindrical wall defining the lower portion 28 of the horn. A maximum diameter of the conical wedge 40 of each antenna post 34 is equal to the diameter of the central portion 38 of the post 34, and is equal to the maximum diameter of the upper portion 36 of the post.

An upper surface 52 of the upper portion 36 of each antenna post 34 may be aligned with the upper surface 18 of the upper layer 16, as best seen in FIG. 2B. Further, the array of antenna cells 22 may be a regular rectangular array, as shown. It should be understood that any suitable materials may be utilized in the construction of the plasmonic infrared optical antenna 10. For example, the metallic upper layer 16 and the antenna posts 34 may be gold, the thin film layer 14 may be silicon nitride ($Si_3N_4$), and the substrate 12 may be silicon. It will be understood that silicon nitride has poor infrared absorption efficiency and was selected here to show that the plasmon infred optical antenna 10 can increase such weak IR absorption; and may be expected to increase the absorption efficency of better IR absorption materials in the same manner.

In each antenna cell 22, the space between the antenna post 34 and the walls of the conical antenna horn is filled with air, serving as the antenna cell's dielectric material. The configuration of the conical antenna horn and the antenna post 34 allows for impedance matching between the free-space and the infrared absorbing thin film layer 14. The relatively large input aperture of the cell 22 also allows the antenna element to collect most of the incident infrared radiation, and provides for sub-wavelength nano-focusing of the infrared radiation beyond the diffraction limit, particularly down to an approximately 50 nm-wide area at the mouth of the waveguide 50.

The particular configuration of the antenna post 34 and the walls defining the conical antenna horn also provide for polarization-insensitive operation of the antenna 10 due to the two-dimensional (2D) symmetry around the central axis of each antenna cell 22 in the array. Moreover, the particular geometry allows for a wide field-of-view (FOV) angle ≅80°. As will be described in greater detail below, the dimensions of the antenna 10 may be optimized for optical-impedance matching over three optical infrared (IR) wavelength bands, including the near-infrared (NIR: 0.74-1 μm), the shortwave infrared (SWIR: 1-3 μm), and the midwave infrared (MWIR: 3-5 μm). Over each band, the antenna 10 shows a large optical enhancement of the optical field intensity, as high as 12.4 dB (i.e., by ≅17.4 times), and a further large enhancement of infrared absorption efficiency, as high as =80 dB (i.e., eight orders of magnitude) within the thin-film layer.

The geometry of each antenna cell 22 input stage also allows for a broadband optical response, and a large fractional bandwidth as high as ≅42%. The non-resonant size of the antenna 10 is found to be relatively small when compared to its operating wavelength, and thus its plasmonic ohmic losses are reasonable. Additionally, the small size of the antenna 10 makes it suitable for miniature IR detectors. As noted above, air is used as the dielectric material within each antenna element, thus reducing the plasmonic ohmic losses on the gold surface (i.e., on the upper surface 18 of the upper layer 16, including on the surfaces of the conical horn, post, and annular waveguide) as well, because the plasmonic field becomes less confined to the metal-dielectric interface.

The incident free-space infrared radiation is almost totally collected by the antenna 10 through the relatively large aperture of the "first stage" of each antenna cell 22 (i.e., the upper portion 26 of the conical antenna horn and the upper and middle portions 36, 38 of the corresponding, coaxial antenna post 34). The first stage, with the air-filled dielectric, acts like a metal-insulator-metal (MIM) structure with a conical flare. The first stage is end-fire excited by incident IR radiation to generate SPPs on its gold surfaces, and results in a $TE_{11}$ mode propagating along the MIM conical structure in the negative Y-direction (with reference to the coordinate axes shown in FIG. 1). Both the plasmonic electric and magnetic fields are squeezed gradually until they reach a sub-wavelength nano-wide annular area at the first stage output. This area equals:

$$\pi \times \left[\left(\frac{B}{2} + F\right)^2 - \left(\frac{B}{2}\right)^2\right],$$

with a preset selected nano-width F of 50 nm, where B is the maximum diameter of the upper portion 36 (which is equal to the constant diameter of the middle portion 38) of the post 34, and F is the radial thickness between the exterior surface of the middle portion 38 and the wall defining the lower portion 28 of the conical antenna horn (i.e., the radial thickness of the annular band of air within the lower portion 28 of the conical antenna horn surrounding the post 34 in this region). These dimensions, along with the maximum diameter, A, of the upper portion 26 of the conical antenna horn (i.e., the diameter of the circular opening formed in the upper surface 18 of the upper layer 16), the diameter, C, of the upper surface 52 of the upper portion 36 of the antenna post 34, and the vertical height, E, of the upper portion 36 of the antenna post 34 (i.e., the height measured in the Y-direction), are optimized to best match optical-impedance between the antenna cell 22 and the free-space on the antenna cell's input side. In other words, these parameters are optimized to minimize the optical back-reflections and maximize the forward propagating transmitted signal.

In order to best match the optical-impedance between first stage output and the "third stage" input (i.e., input within thin film layer 14), an annular waveguide (WG) with annular width F and an air filling dielectric is placed between them as an intermediate "second stage". The WG acts like a natural extension to the first stage that propagates the $TE_{11}$ squeezed mode, thus minimizing back-reflections. In addition, the vertical height, G, of the annular waveguide 50 (i.e., the vertical height, measured in the Y-direction, of central portion 38 of post 34, as well as the vertical height, measured in the Y-direction, of lower portion 28 of the conical antenna horn) is optimized to maximize the transmission through the second stage into the thin film layer 14.

The finite length WG exhibits a Fabry-Perot effect with multiple reflections between its input and output interfaces. The length G is selected such that the round-trip total phase-shift of the WG is $2Gk+\Delta\varphi=m\pi$, where $\Delta\varphi$ is the total excess phase-shifts due to reflections at the WG input/output interfaces, k is the electromagnetic field propagation constant, and m is an integer. This condition results in destructive interference among back-reflected waves at the WG input, and thus constructive interference among transmitted waves at the WG output.

The third stage of each antenna element consists mainly of the gold conical wedge 40 of the antenna post 34, which is embedded in the thin-film layer 14. The vertical height, H, in the Y-direction of the conical wedge 40 is equal to the vertical thickness of the thin-film layer 14. The conical wedge 40 and the combination of the middle portion 38 and the stem of the conical antenna horn (i.e., the portion defining the lower portion 28 of the horn) act together like a flared MIM structure that is excited by the SPP coming out of the annular WG 50. This excited SPP mode propagates while spreading inside the thin film absorbing layer 14. Therefore, the conical wedge 40 allows excited SPPs to penetrate deep inside the absorbing layer 14 and thus increase the overall absorption area inside the thin film layer 14.

Experiments were performed with an IR absorbing thin film thickness of H=700 nm. The substrate material was chosen to be a bulk silicon (Si). The plasmon infrared optical antenna 10 was tested over the NIR, SWIR and MWIR wavelength bands. As will be described in greater detail below, it was found that there are four designs, each with specific dimensions that can cover these three bands.

Table 1 below shows these designs with their corresponding dimensions. The following design rules were applied: For each wavelength range, the height of the upper portion 26 of the conical antenna horn, E, should be $\geq \lambda_{max}$ (where $\lambda_{max}$ is the maximum wavelength) of that range. This is because at least one electric-field cycle should exist along the height E. Additionally, the inner perimeter of the annular WG 50 (i.e., $\pi \times B$) should be $\geq \lambda_{max}$ of the corresponding wavelength range. This is because the squeezed $TE_{11}$ magnetic field around the annular WG perimeter cannot be smaller than $\lambda_{max}$ for a mode to survive. Further, in order to minimize the overall SPP ohmic loss on a gold surface, the height E and ($\pi \times B$) were selected to be approximately equal to $\lambda_{max}$ (i.e., the minimum possible value).

The maximum diameter, A, of the upper portion 26 of the conical antenna horn was selected to keep the coaxial horn symmetric between the inner and outer sides of the annular WG 50. The dimensions C, D, G, and L (the distance between the central axes of adjacent ones of the antenna cells 22, as shown in FIG. 1) are selected through numerical iterations to minimize the back-reflections and maximize the overall transmission; i.e., they are optimized for the best optical-impedance matching over each wavelength range. The largest unit-cell design (i.e. the maximum dimensions for each individual antenna cell) was found to be for the MWIR band, with dimensions of 3.25×3.25×6.8 µm³, while the largest unit-cell aspect-ratio was found to be for the NIR band, with a value of 3.6:1. The dimensions of the four designs indicate an overall compact-size relative to the operating wavelength and a reasonable aspect ratio. In the following examples, the antenna designs 1, 2, 3, and 4, as will be discussed in greater detail below (see Table 1 below), can be used in solar cells, optical communications photodetectors, SWIR sensors/cameras, and MWIR thermal detection/imaging with microbolometers, respectively.

TABLE 1

| | | Design Parameters for Antenna Designs 1, 2, 3 and 4 | | | | | | | |
|---|---|---|---|---|---|---|---|---|---|
| IR-Band | Band Range (µm) | Design | A | B | C | D | E | G | L |
| NIR | 0.74-1 | 1 | 0.6 | 0.32 | 0.05 | 0.125 | 1 | 0.5 | 0.625 |
| SWIR | 1-2 | 2 | 1.4 | 0.7 | 0.05 | 0.25 | 2 | 1 | 1.425 |
| | 2-3 | 3 | 2 | 1 | 0.1 | 0.35 | 3 | 0.5 | 2.025 |
| MWIR | 3-5 | 4 | 3.2 | 1.6 | 0.2 | 0.55 | 5 | 1 | 3.25 |

Figure 3E:
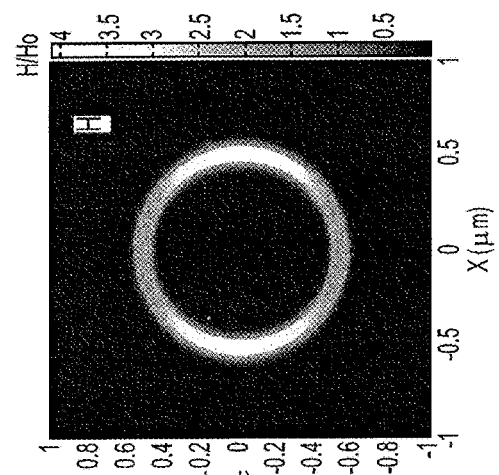
FIG. 3E shows the normalized magnetic field magnitude results of the 3D FDTD simulation performed on a single antenna cell of the plasmonic infrared optical antenna, shown here for a horizontal cross-section located at the input of the annular waveguide (WG).
Figure 3B:
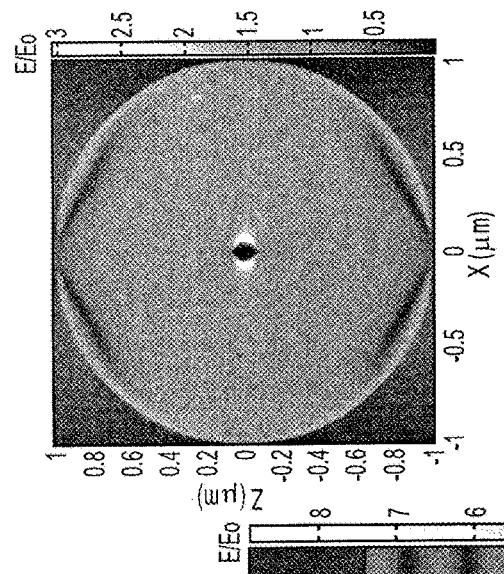
FIG. 3B shows the normalized electric field magnitude results of the 3D FDTD simulation performed on a single antenna cell of the plasmonic infrared optical antenna, shown here for a horizontal cross section located at an input to the antenna horn.
Figure 3D:
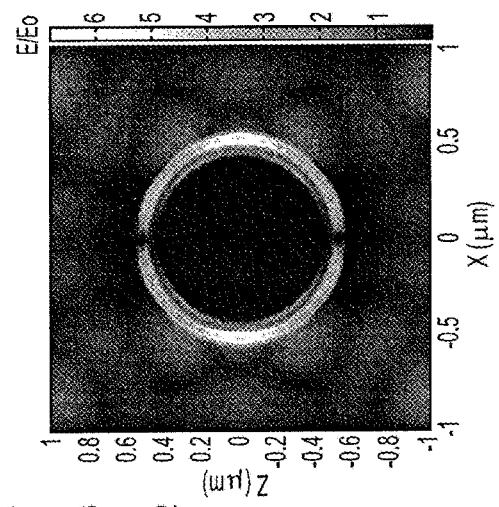
FIG. 3D shows the normalized electric field magnitude results of the 3D FDTD simulation performed on a single antenna cell of the plasmonic infrared optical antenna, shown here for a horizontal cross-section located at the output of the annular waveguide (WG), i.e., at the entrance to the thin film layer of the antenna.
Figure 3A:
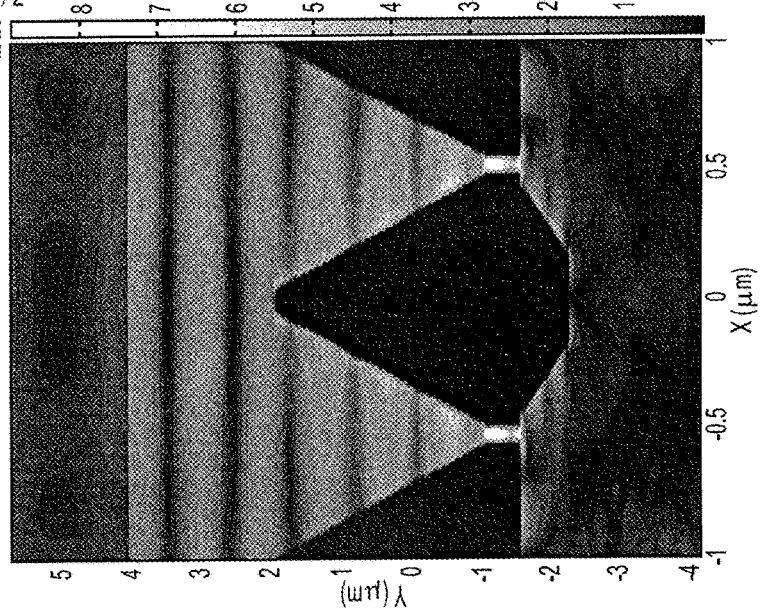
FIG. 3A shows normalized electric field magnitude results of a three-dimensional (3D) finite-difference time-domain (FDTD) simulation performed on a single antenna cell of the plasmonic infrared optical antenna, shown here for a vertical cross section.
Figure 4A:
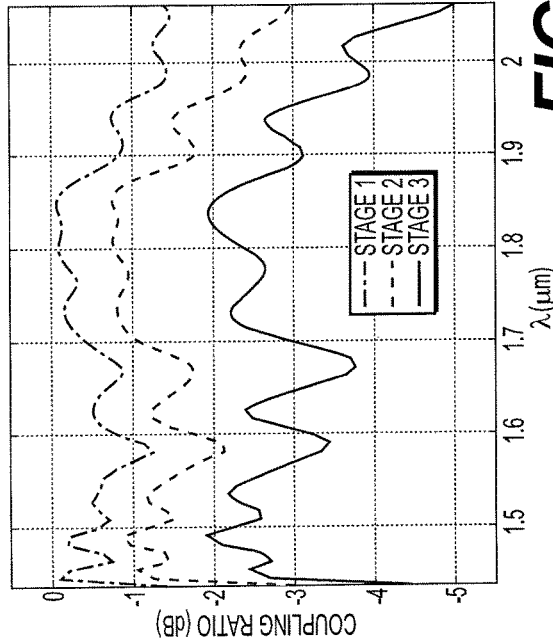
FIG. 4A is a graph showing the estimated coupling ratio of transverse magnetic (TM) polarized infrared radiation passing through successive stages of a first design of the plasmonic infrared optical antenna.
Figure 4B:
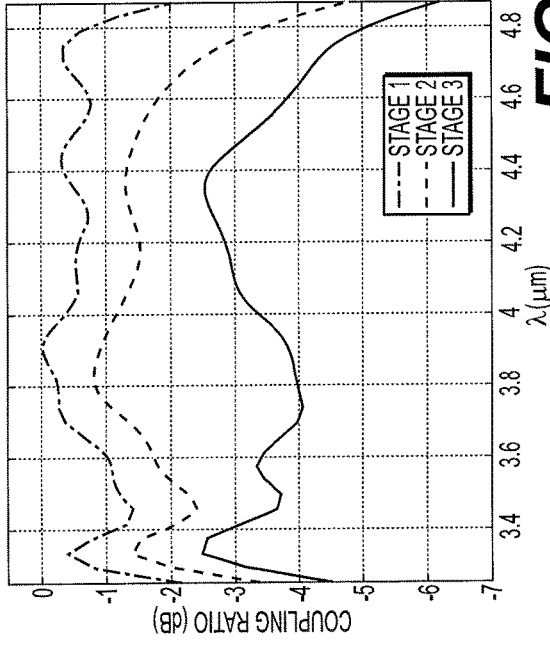
FIG. 4B is a graph showing the estimated coupling ratio of TM-polarized infrared radiation passing through successive stages of a second design of the plasmonic infrared optical antenna.
Figure 4C:
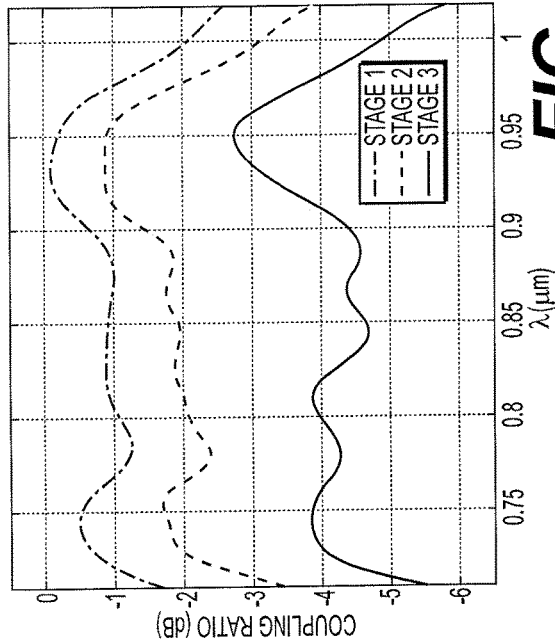
FIG. 4C is a graph showing the estimated coupling ratio of TM-polarized infrared radiation passing through successive stages of a third design of the plasmonic infrared optical antenna.
Figure 4D:
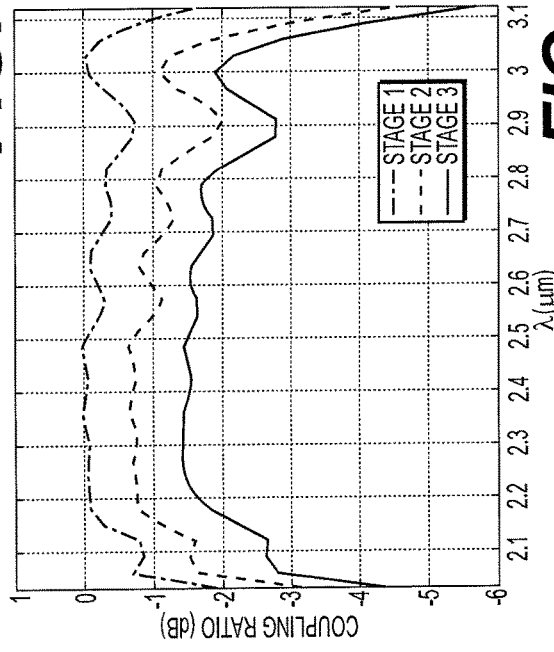
FIG. 4D is a graph showing the estimated coupling ratio of TM-polarized infrared radiation passing through successive stages of a fourth design of the plasmonic infrared optical antenna.
Figure 5A:
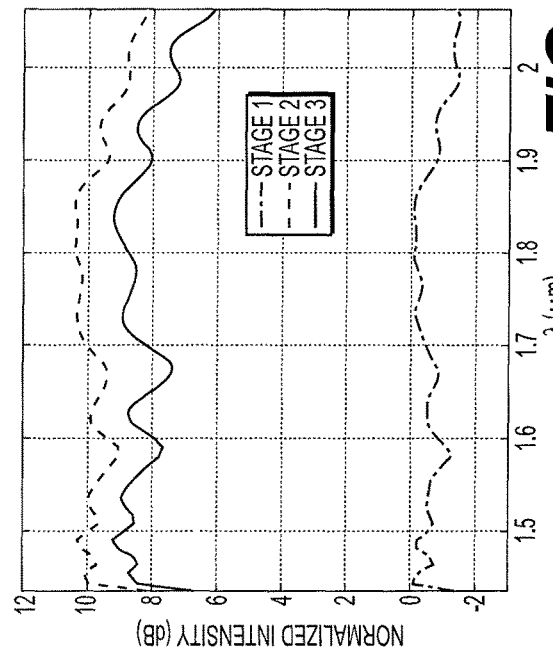
FIG. 5A is a graph showing the normalized intensity of transverse magnetic (TM) polarized infrared radiation passing through successive stages of a first design of the plasmonic infrared optical antenna.
Figure 5B:
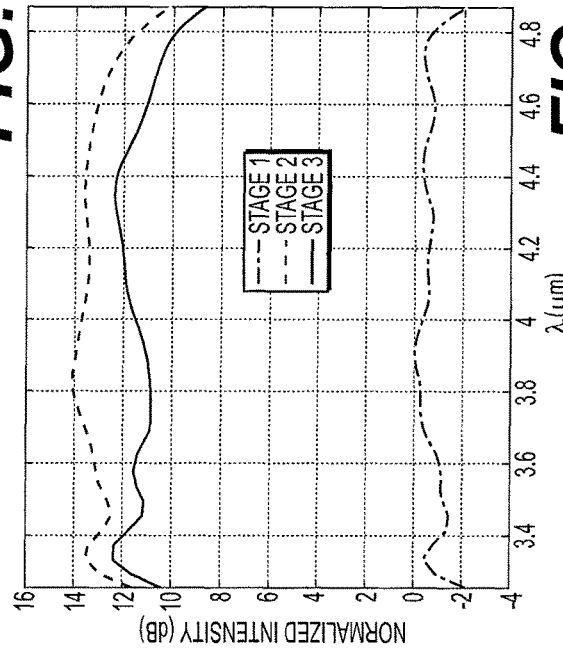
FIG. 5B is a graph showing the normalized intensity of TM-polarized infrared radiation passing through successive stages of a second design of the plasmonic infrared optical antenna.
Figure 5C:
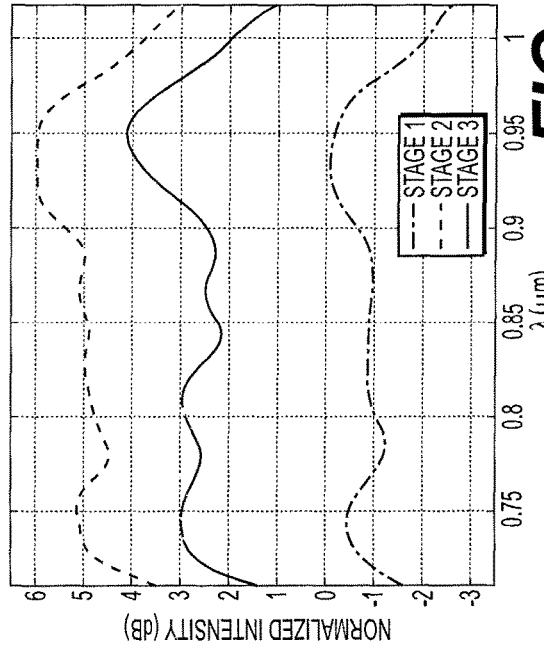
FIG. 5C is a graph showing the normalized intensity of TM-polarized infrared radiation passing through successive stages of a third design of the plasmonic infrared optical antenna.
Figure 5D:
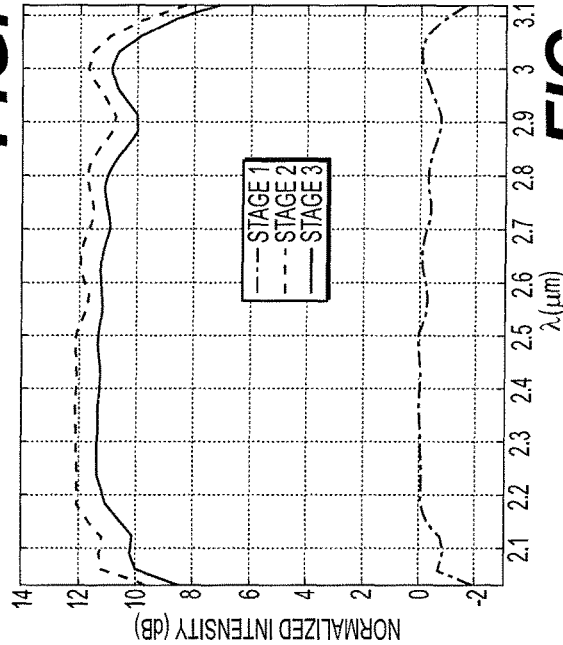
FIG. 5D is a graph showing the normalized intensity of TM-polarized infrared radiation passing through successive stages of a fourth design of the plasmonic infrared optical antenna.
Figure 6A:
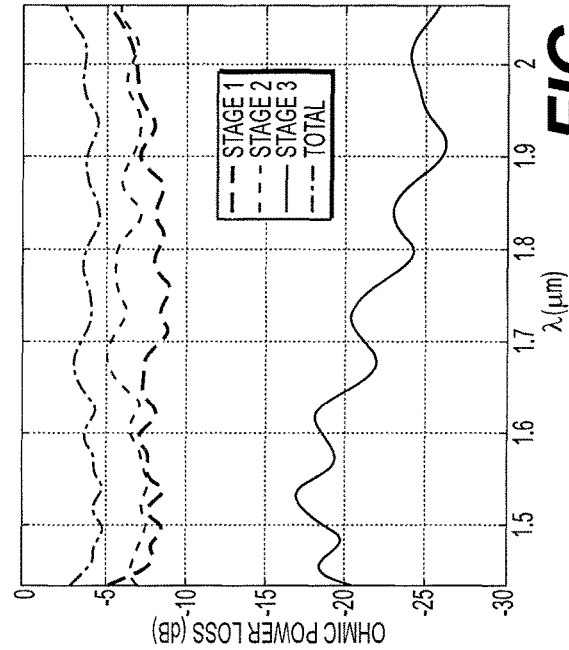
FIG. 6A is a graph showing surface plasmon polariton (SPP) ohmic-power losses of infrared radiation passing through successive stages of a first design of the plasmonic infrared optical antenna.
Figure 6B:
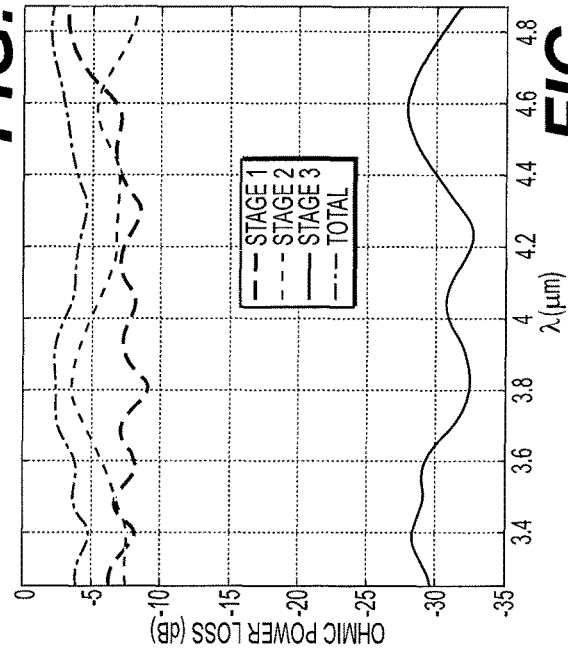
FIG. 6B is a graph showing SPP ohmic-power losses of infrared radiation passing through successive stages of a second design of the plasmonic infrared optical antenna.
Figure 6C:
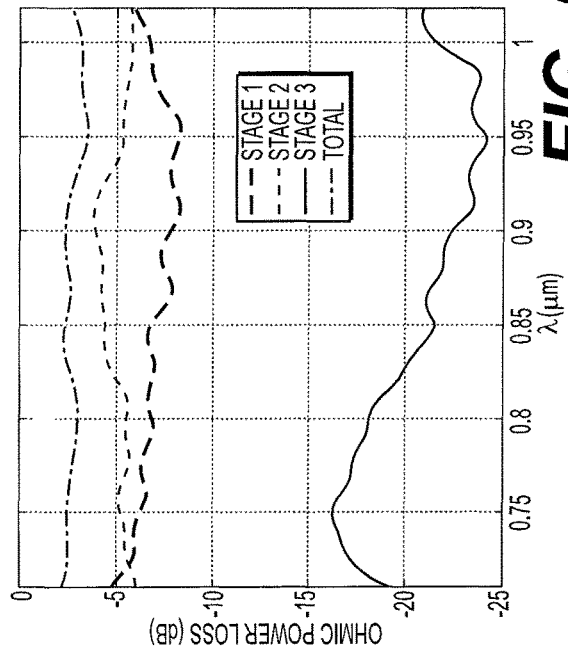
FIG. 6C is a graph showing SPP ohmic-power losses of infrared radiation passing through successive stages of a third design of the plasmonic infrared optical antenna.
Figure 6D:
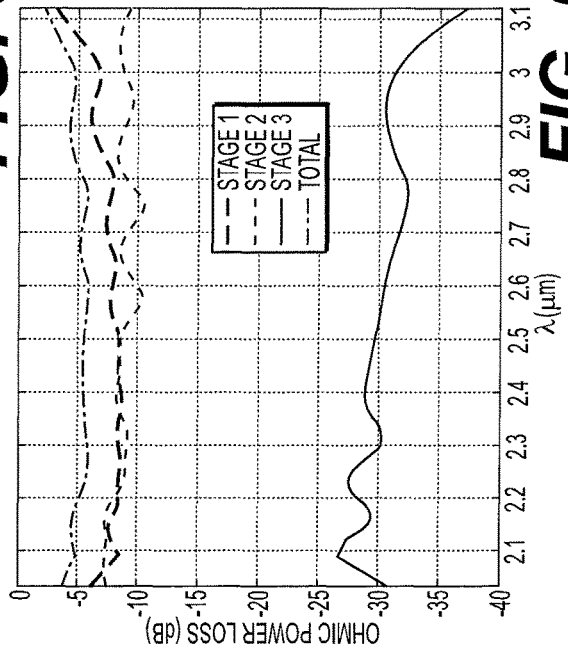
FIG. 6D is a graph showing SPP ohmic-power losses of infrared radiation passing through successive stages of a fourth design of the plasmonic infrared optical antenna.
Figure 7A:
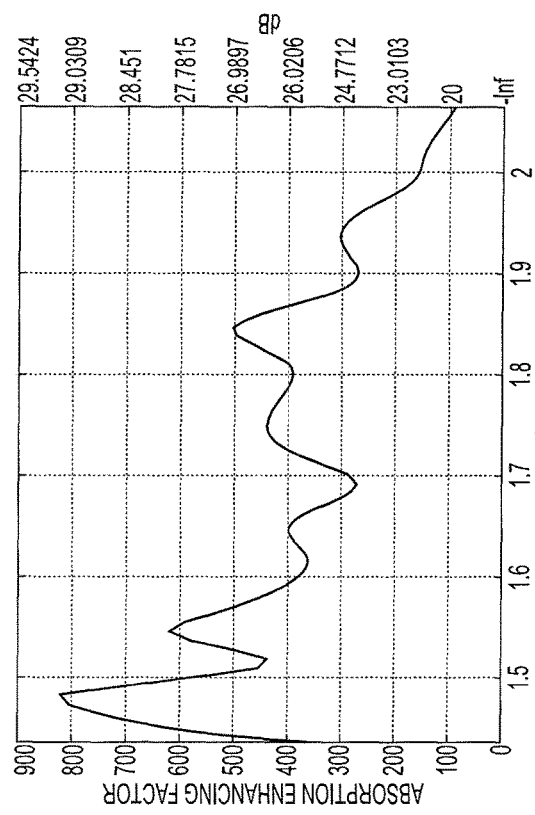
FIG. 7A is a graph showing the absorption enhancement factor inside the thin film layer of a first design of the plasmonic infrared optical antenna.
Figure 7B:
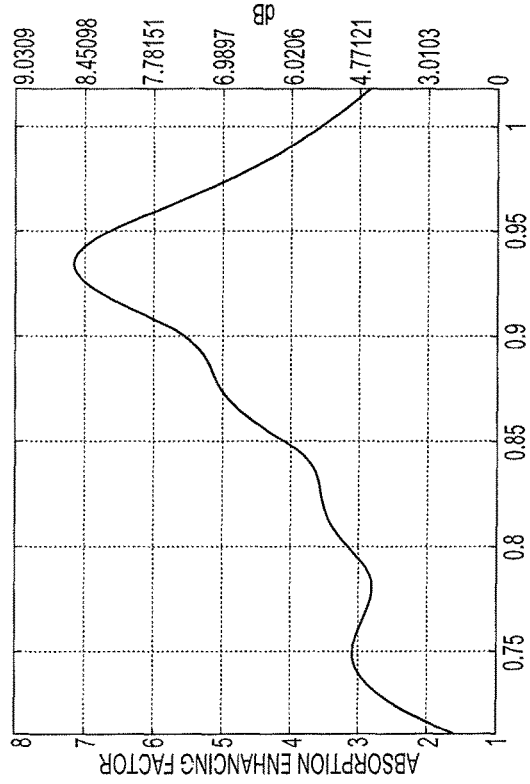
FIG. 7B is a graph showing the absorption enhancement factor inside the thin film layer of a second design of the plasmonic infrared optical antenna.
Figure 7C:
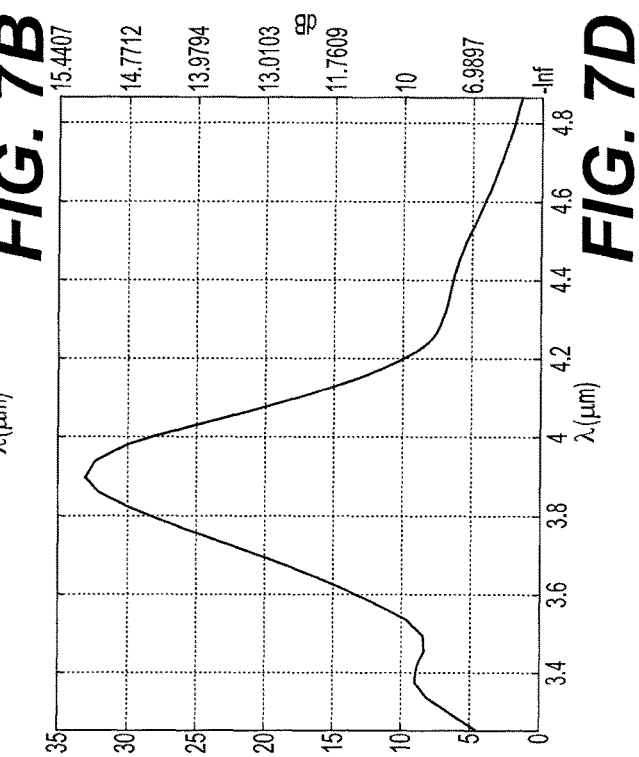
FIG. 7C is a graph showing the absorption enhancement factor inside the thin film layer of a third design of the plasmonic infrared optical antenna.
Figure 7D:
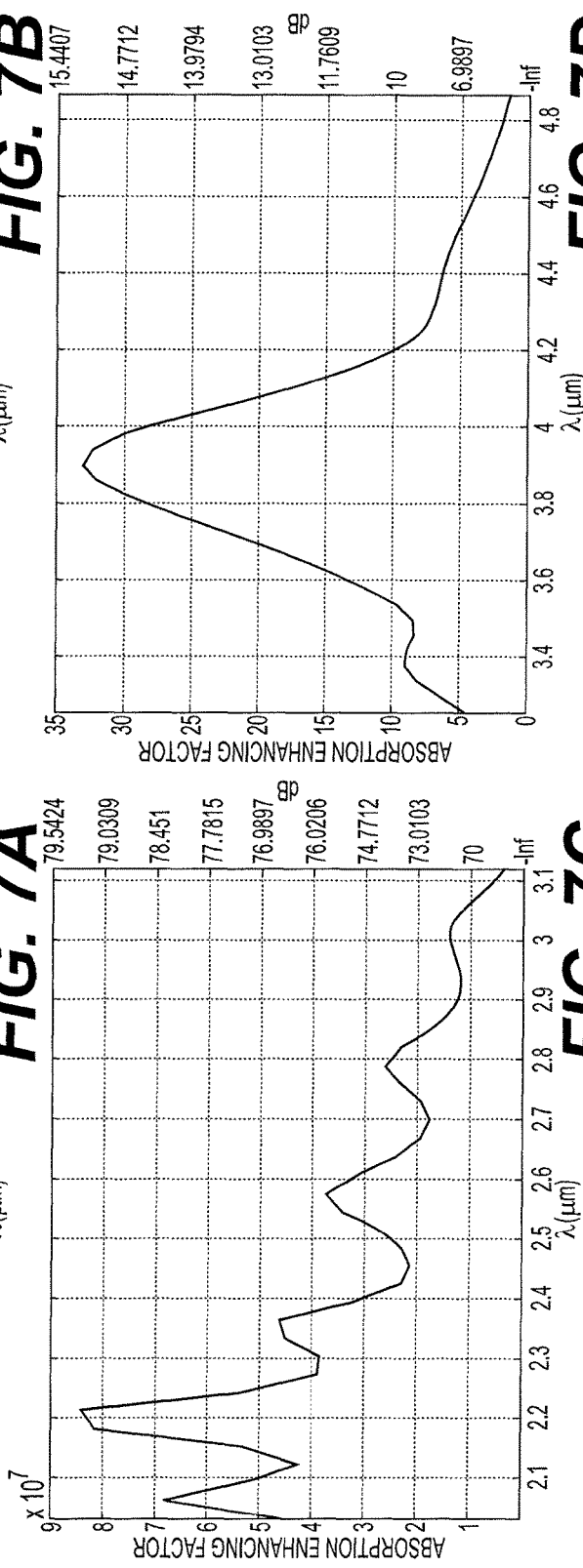
FIG. 7D is a graph showing the absorption enhancement factor inside the thin film layer of a fourth design of the plasmonic infrared optical antenna.
Figure 8A:
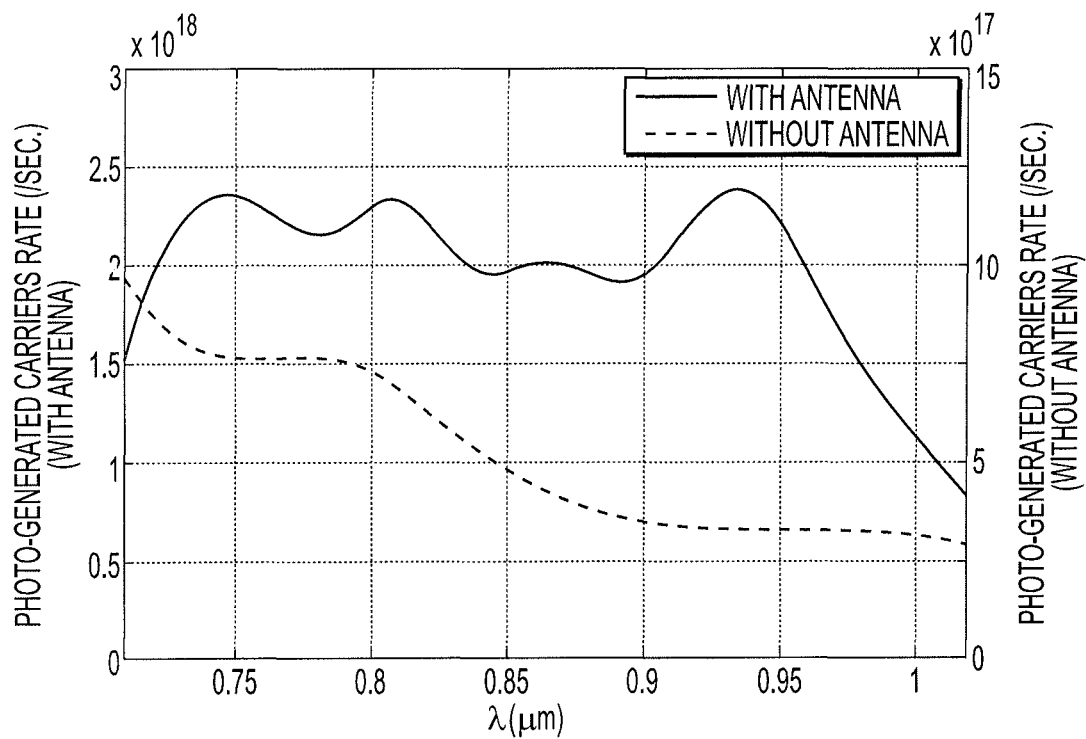
FIG. 8A is a graph showing the estimated photo-carrier rate inside the thin film layer of the first design of the plasmonic infrared optical antenna, and compared against a case without the structure of the plasmonic infrared optical antenna.
Figure 8B:
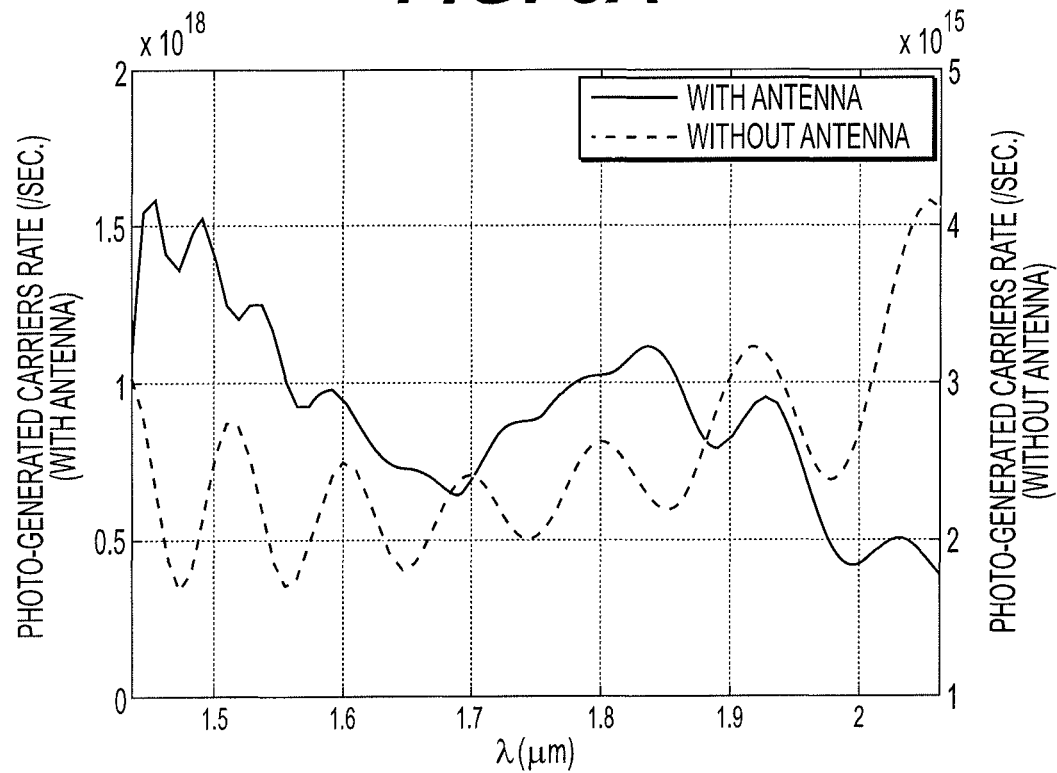
FIG. 8B is a graph showing the estimated photo-carrier rate inside the thin film layer of the second design of the plasmonic infrared optical antenna, and compared against a case without the structure of the plasmonic infrared optical antenna.
Figure 8C:
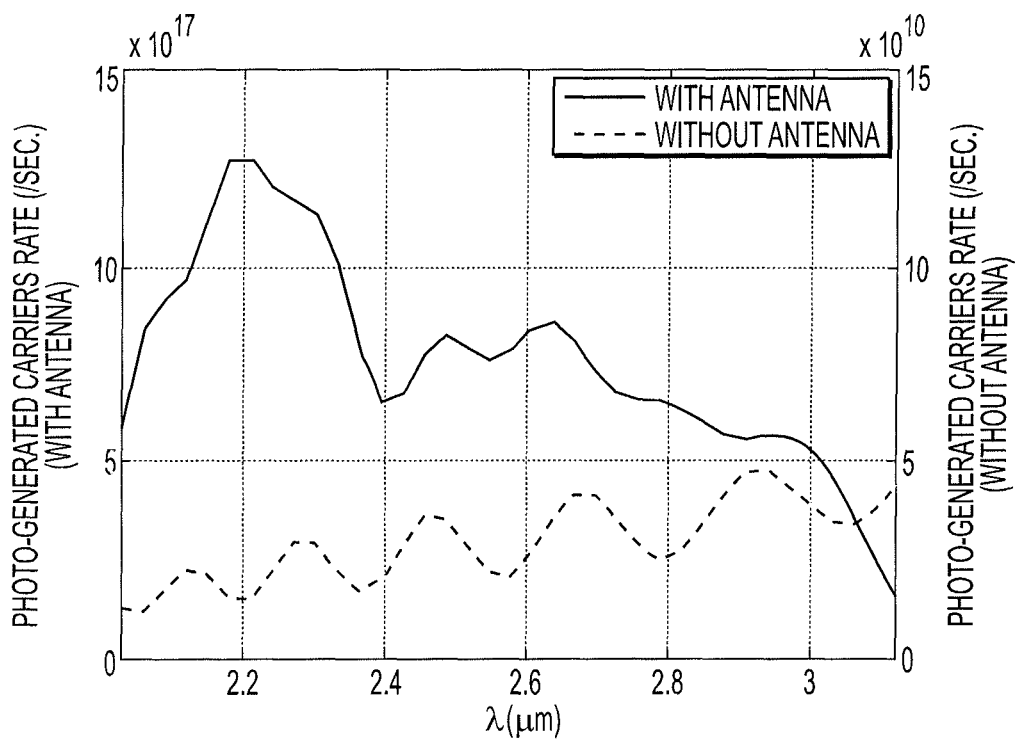
FIG. 8C is a graph showing the estimated photo-carrier rate inside the thin film layer of the third design of the plasmonic infrared optical antenna, and compared against a case without the structure of the plasmonic infrared optical antenna.
Figure 8D:
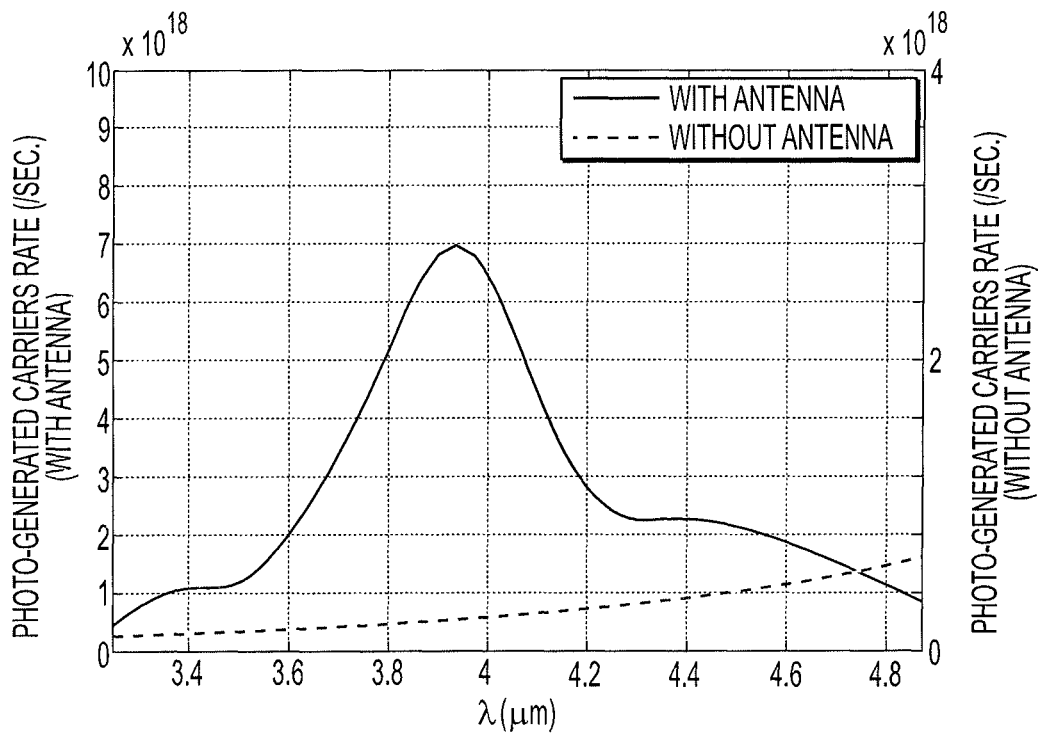
FIG. 8D is a graph showing the estimated photo-carrier rate inside the thin film layer of the fourth design of the plasmonic infrared optical antenna, and compared against a case without the structure of the plasmonic infrared optical antenna.
Figure 9A:
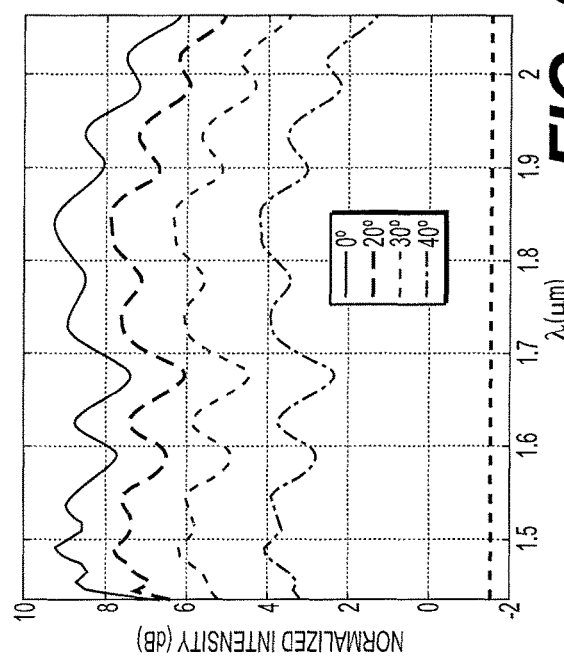
FIG. 9A is a graph showing normalized intensity out of the first design of the plasmonic infrared optical antenna as a function of incident radiation angles.
Figure 9B:
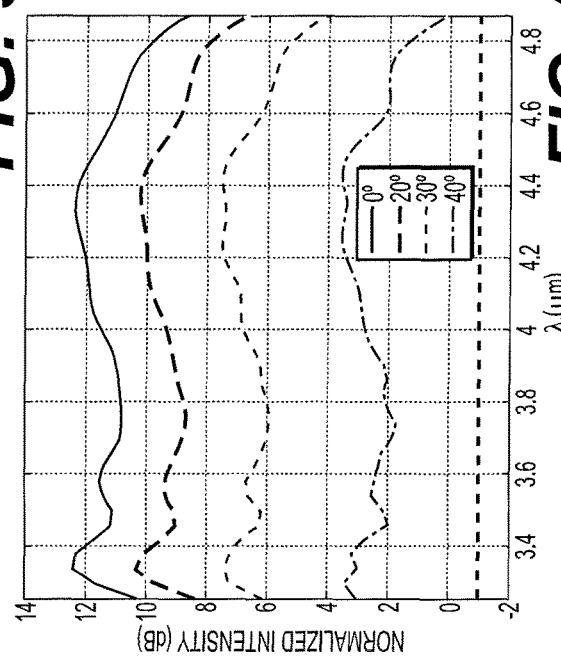
FIG. 9B is a graph showing normalized intensity out of the second design of the plasmonic infrared optical antenna as a function of incident radiation angles.
Figure 9C:
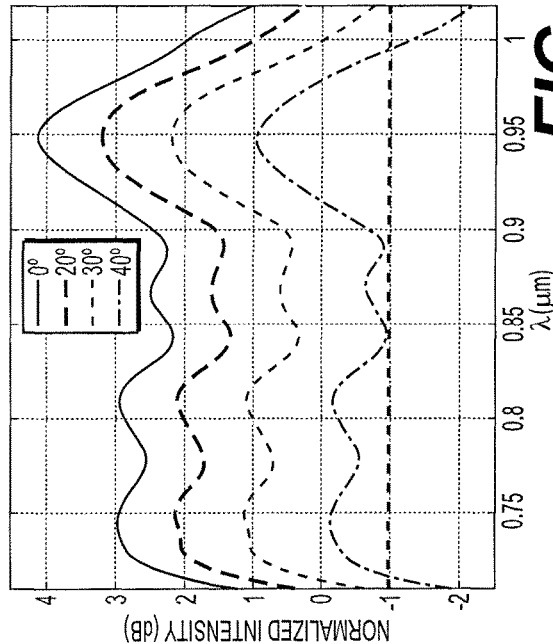
FIG. 9C is a graph showing normalized intensity out of the third design of the plasmonic infrared optical antenna as a function of incident radiation angles.
Figure 9D:
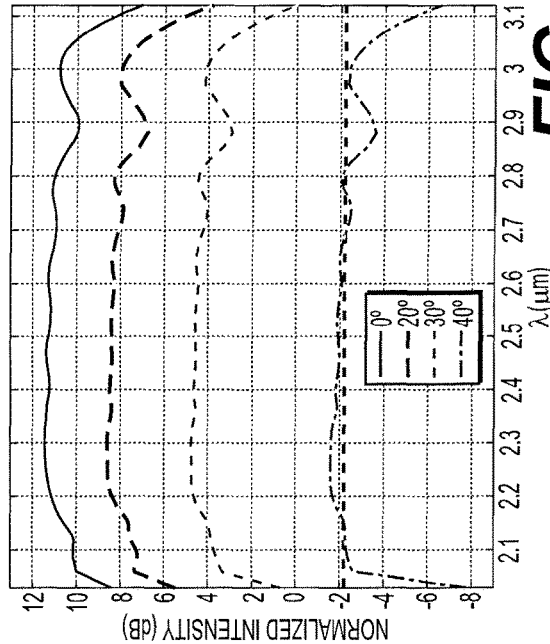
FIG. 9D is a graph showing normalized intensity out of the fourth design of the plasmonic infrared optical antenna as a function of incident radiation angles.

Three-dimensional (3D) finite-difference time-domain (FDTD) simulations were performed on the plasmon infrared optical antenna 10, as shown in FIGS. 3A-3E. FIGS. 3A-3E show the normalized magnitudes of the electric field of a single cell 22 when incident infrared light radiation propagates along the negative Y-direction. The wavelength in these simulations is 2.3 µm with a transverse magnetic (TM) linearly polarized wave along the X-direction. FIG. 3A shows a vertical cross-section of a cell 22 (X-Y plane) at Z=0 (similar to that in FIGS. 2B and 2C). As shown, the SPP propagating electric fields inside the concentric "horn" of the antenna element are concentrated around the post because it has a small apex angle. The highest electric field intensity is found to be around and within the 50 nm-wide annular WG. Within the thin film layer, the high-intensity field propagates and spreads inside the layer with more SPP concentration around the wedge 40 and base. This high-intensity field is absorbed and exponentially attenuated within the thin-film layer 14. It almost vanishes inside the silicon substrate 12 (extending beyond Y≤−2 µm). The very small back-reflected electric field from the structure appears alone at the top of the Figure, beyond the source.

FIGS. 3B, 3C and 3D show the electric field of horizontal cross sections (X-Z plane) at the antenna element's input, the annular WG input, and the WG output, respectively. FIG. 3E shows the magnetic field of the horizontal cross section at the annular WG input. These Figures illustrate the evolution of $TE_{11}$ mode squeezing (compression) from free-space down to the 50 nm-wide "hot" annular area at the thin-film layer input. FIG. 3B shows the normalized electric field of the $TE_{11}$ mode profile (TM-polarized) at the concentric "horn" input, with more concentration around the center post. FIG. 3C shows the squeezed electric field magnitude of the $TE_{11}$ plasmonic mode at the annular WG input (i.e., the concentric horn output). The normalized electric field reaches a maximum of 8 at the annular WG ring, indicating an almost eight times improvement in the field strength (i.e., =18 dB), compared to the incident free-space radiation. FIG. 3E shows the squeezed normalized magnetic field magnitude for the $TE_{11}$ plasmonic mode at the annular WG input. It reaches a maximum of 4 at the annular WG ring, indicating an almost four times improvement in the field strength (i.e., ≅12 dB), compared to the incident free-space radiation. It should be noted that the electric field of the $TE_{11}$ mode vanishes at the top and bottom of FIG. 3C, as the magnetic field becomes totally directed along the Y-axis with zero X and Y components. FIG. 3D shows the squeezed electric field just outside the annular WG and inside the thin-film layer. The electric field strength starts to attenuate due to optical absorption inside the thin-film layer.

The 3D-FDTD simulations were also utilized to characterize and evaluate the performance of the antenna designs over their corresponding wavelength ranges. FIGS. 4A-4D show the coupling ratio (CR) in decibels of TM-polarized radiation into each antenna stage against the corresponding wavelength range. FIGS. 4A, 4B, 4C and 4D correspond to designs 1, 2, 3 and 4, respectively. The CR is defined as 10 $\log_{10}$ T, where T is the power transmission measured at each stage input. For each design, the CR into the first stage is considerably high. However, it does not reach a value of zero dB (i.e., T=1) because of the inevitable small back-reflections (1-T) into free space. The back-reflections are estimated to be ≤−7 dB over most of the tested bands. The CR within the third stage indicates a high collection efficiency of the antenna to incident free-space radiation. This is despite the relatively thick gold layer (E+G) of antenna 10 on top of the absorption thin film layer 14, which is expected to obscure most of the incident light by back-reflections and metal ohmic losses. As expected, the CR of the second and third stages is less than that of the first stage due to SPP ohmic power loss on the gold surfaces of the concentric horn and the annular WG, respectively.

The 3 dB bandwidth (BW) of the antenna 10 is estimated from the CR curve of the third stage, as it indicates the amount of power transferred by the antenna 10 to the thin film layer 14. The small ripples appearing on the curves are due to the Fabry-Perot effect, which is due to the residual multiple reflections from different interfaces of the antenna stages. Table 2 below indicates the measured bandwidth for each antenna design, together with its estimated center wavelength ($\lambda_0$), and the calculated optical fractional bandwidth (O-FBW). The O-FBW is defined as the ratio of measured bandwidth to center-wavelength (i.e., BW/$\lambda_0$). Table 2 illustrates a broadband optical response (i.e., BW) with a considerably high optical fractional bandwidth ranging from ≅35% up to 42%.

TABLE 2

Broadband Optical Response (BW) and Optical Fractional Bandwidth (O-FBW)

| IR-Band | Design | Wavelength Range (μm) | BW | $\lambda_0$ (μm) | O-FBW (%) |
|---|---|---|---|---|---|
| NIR | 1 | 0.71-1.01 | 0.3 | 0.86 | 34.9 |
| SWIR | 2 | 1.43-2.06 | 0.63 | 1.75 | 36 |
|  | 3 | 2.03-3.12 | 1.1 | 2.58 | 42.6 |
| MWIR | 4 | 3.25-4.86 | 1.61 | 4.06 | 39.7 |

FIGS. 5A-5D are similar to FIGS. 4A-4D, but they show the normalized intensity at each stage. The normalized intensity is calculated as 10 $\log_{10}(I/I_{in})$, where I is the intensity at each stage input, calculated as the transmitted power divided by the area, and $I_{in}$ is the total intensity at the antenna input. Unlike FIGS. 4A-4D, FIGS. 5A-5D show improvement in the normalized intensity while propagating from stage 1 to stage 3, despite ohmic power loss. This is because of the field squeezing and, in turn, a dramatic reduction in the area. In other words, the gain in optical intensity becomes high despite power attenuation by SPP ohmic losses because of the considerable compression of the fields' areas. The importance of measuring intensity here is that it is the key parameter in controlling the material's absorption efficiency. This is because the effective absorption cross-sectional area of material atoms, and, in turn, the material's absorption coefficient is directly proportional to the incident optical field intensities (i.e., nano-focusing of fields), as noted above. Thus, the absorption efficiency of the thin-film layer 14 is expected to increase, as will be discussed in greater detail below. However, it should be noted that the normalized intensity reduces from stage 2 to stage 3. This is because the area of the fields remains constant, and, thus, the SPP ohmic losses become dominant. The maximum achieved normalized intensity is 12.4 dB at a wavelength of 3.3 μm, which is almost a factor of ≅17.4 times (see FIG. 5D).

FIGS. 6A-6D show the ohmic power losses within each stage of the antenna 10, in addition to its total power loss. The ohmic power loss is calculated as the difference between the net input and output power of each stage, divided by the antenna's total input power. The power loss inside the third stage is dissipated within the wedge and the base, and it is the smallest one. However, the losses within stages 1 and 2 are higher than stage 3. The loss of the relatively long concentric horn (stage 1) is often comparable or even less than that of the shorter annular waveguide (stage 3). This is because the annular waveguide has a very small width of 50 nm, thus it acts as a narrow MIM waveguide, with expected losses higher than or comparable to that of the concentric horn. The summation of ohmic losses over all three stages (i.e., the total loss) has a maximum, minimum, and an average value of ≅−2 dB, −6 dB, and −3 dB, respectively, for all designs and over different corresponding bandwidths, which can be considered reasonable.

It was found that the polarization dependence of the different designs over their corresponding bandwidths is negligible (≅zero). The polarization dependence is defined as the ratio between the transferred powers by the antenna in the case of TM and transverse electric (TE) incident polarizations. This polarization insensitivity is due to the 2D symmetry of the geometry of each antenna element around its central axis (i.e., along the Y-direction). Thus, the antenna's optical responses are always the same for all types of incident polarizations. Thus, the antenna 10 can collect most of the incident radiation power, regardless of its polarization.

FIGS. 7A-7D show the absorption enhancement factor (EF) within the thin-film layer 14. The EF is defined as the ratio of absorbed power in the thin-film layer between the case with the entire structure of antenna 10 and without this structure. The EF is shown in both linear scale and decibels on the left and right vertical axes, respectively. The absorption enhancement factor is quite high and can reach a maximum value of ≅8.5, 29, 80, and 15 dB for designs 1, 2, 3 and 4, respectively, while the smallest possible EF is ≅2 dB for a pair of the designs, but just at the bandwidth edges. The very high EF of designs 2 and 3 are due to the very low extinction coefficients of silicon nitride materials (i.e., small attenuation coefficients) within the corresponding wavelength bands. In other words, the silicon nitride absorption without the rest of the antenna structure is almost negligible within these bands, while it becomes high and significant with the full antenna structure. Therefore, the power absorption enhancement becomes remarkable and significant due to the structure of the antenna 10, especially within these two wavelength bands. For example, it can reach as high as ≅80 dB at a wavelength of ≅2.2 µm because the improved power absorption with antenna 10 is divided by the negligible power absorption of the material without the antenna structure. The ripples on some curves are because of the Fabry-Perot effect, due to residual multiple reflections among the antenna's different stages. It should be noted that the enhanced absorption efficiency of the thin-film layer is due to the improved material absorption coefficient as the incident optical field intensities become much higher.

FIGS. 8A-8D show the estimated photo-generated carriers' rate per second within the thin-film layer 14. This estimate is calculated as a function of the wavelength by dividing the total amount of IR absorbed power inside the thin film by the photon energy, assuming that each absorbed photon generates one electron-hole pair. The photon energy is calculated as hc/λ, where h is Planck's constant, c is the speed of light, and λ is the wavelength. For assessment and comparison, the photo-generated carriers are estimated for both cases; i.e., with and without the antenna structure. Each case is plotted on a separate linear axis in order to illustrate the improvement in photo-generation rate. As shown, the improvement can be dramatic, especially for designs 2 and 3, as noted above. It is well known that the detector quantum efficiency is directly proportional to the number of photo-generated carriers, in addition to some other parameters, depending on the IR detector type and specific structure. Therefore, the illustrated enhancement of generated carriers' rate here can be used to show the improvement in the quantum efficiency of IR detection devices.

FIGS. 9A-9D show the normalized intensity out of antenna 10 as a function of different incidence angles of free-space radiation. The incidence angle is varied beyond the normal incidence (i.e., zero angle) while monitoring the reduction in output normalized intensity. The incident radiation intensity is expected to reduce with angle as the incident fields' components become smaller. The dashed horizontal lines in FIGS. 9A-9D correspond to the normalized intensity in the case of thin film without the antenna structure. The dashed horizontal lines are considered to be the limit of allowed intensity reduction, and thus the limit for maximum incidence angle. For all designs, the maximum incidence angle is found to be ≅40°, indicating an antenna field-of-view (FOV)≅2×40°≅80°.

It is to be understood that the plasmonic infrared optical antenna is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A plasmonic infrared optical antenna adapted to form an optical array operating in the infrared range, comprising a multi-layer structure including:
    a substrate layer having a first thickness;
    a thin-film layer of an infrared absorption material disposed on the substrate layer and having a second thickness less than the first thickness of the substrate layer; and
    an upper layer of a metallic material capable of supporting a plasmonic electromagnetic field, the upper layer being thicker than and disposed on the thin-film layer and having a top surface exposed to air, the upper layer having a plurality of plasmonic antenna cells disposed in a symmetrical periodic array of plasmonic antenna cells, each of the plurality of plasmonic antenna cells consisting of:
        a) an inverted frusto-conical upper portion defining a wide diameter circular opening in the top surface of the upper layer and a narrow diameter opening between the top surface and the thin-film layer;
        b) a cylindrical lower portion extending in the upper layer between the narrow diameter opening of the frusto-conical upper portion and the thin-film layer, the upper portion and the lower portion defining a conical antenna horn; and
        c) a post concentrically disposed in the conical antenna horn, the post consists of:
            i) a conical upper portion extending through the frusto-conical upper portion of the cell and tapering in diameter from wide to narrow between the narrow diameter opening and a plane defined by the top surface of the upper layer;
            ii) a cylindrical middle portion concentrically disposed in the cylindrical lower portion of the cell and defining an annular waveguide between the post and the cylindrical lower portion of the conical antenna horn, the waveguide extending between the narrow diameter opening and the thin-film layer; and
            iii) a conical wedge extending below the cylindrical middle portion of the post, the conical wedge being embedded in the thin-film layer;
    wherein infrared radiation incident on the plurality of plasmonic antenna cells excites a surface plasmon polariton wave detected by the thin-film layer.

2. The plasmonic infrared optical antenna as recited in claim 1, wherein the symmetrical periodic array of plasmonic antenna cells comprises a rectangular array.

3. The plasmonic infrared optical antenna as recited in claim 1, wherein the upper layer of metallic material comprises gold.

4. The plasmonic infrared optical antenna as recited in claim 1, wherein the thin-film layer comprises silicon nitride ($Si_3N_4$).

5. The plasmonic infrared optical antenna as recited in claim 4, wherein the substrate comprises silicon.

6. The plasmonic infrared optical antenna according to claim 1, wherein the thin-film layer has a thickness of 700 nm.

7. The plasmonic infrared optical antenna according to claim 6, wherein the annular waveguide has a thickness of 50 nm.

8. The plasmonic infrared optical antenna according to claim 7, wherein the antenna is tunable over the near infrared, shortwave infrared, and midwave infrared band by adjusting the dimensions of the conical antenna horn.

9. The plasmonic infrared optical antenna according to claim 7, wherein the circular opening in the top surface of the upper layer defined by the inverted frusto-conical upper portion of the plasmonic antenna cell has a diameter between 0.6 and 3.2 microns.

* * * * *